(12) United States Patent
Sakuragi et al.

(10) Patent No.: US 6,466,437 B1
(45) Date of Patent: Oct. 15, 2002

(54) INTERFACE CABLE

(75) Inventors: Satoshi Sakuragi, Yokohama (JP);
Wataru Kakinoki, Yokohama (JP);
Takashi Kuroda, Sagamihara (JP);
Masanori Tsubono, Machida (JP);
Satoru Inomata, Ishikawa-ken (JP)

(73) Assignees: Murata Manufacturing Co., Ltd. (JP);
I-O Data Device, Inc. (JP)

( * ) Notice: Subject to any disclaimer, the term of this patent is extended or adjusted under 35 U.S.C. 154(b) by 0 days.

(21) Appl. No.: 09/603,651

(22) Filed: Jun. 26, 2000

(30) Foreign Application Priority Data

Jul. 2, 1999 (JP) .......................... 11-189749

(51) Int. Cl.⁷ .............................. G06F 1/16
(52) U.S. Cl. ................. 361/686; 361/756; D14/100; 439/67
(58) Field of Search ................ 361/686, 680–683, 361/725–727, 741, 754, 756; D6/396, 397; D14/100, 114; 439/67.77

(56) References Cited

U.S. PATENT DOCUMENTS

| 5,567,180 | A | | 10/1996 | Seo | 439/638 |
| 5,940,275 | A | * | 8/1999 | Laity | 361/737 |
| 5,971,796 | A | * | 10/1999 | Duhr | 439/445 |
| 5,973,925 | A | * | 10/1999 | Kraemer | 361/737 |
| 6,217,378 | B1 | * | 4/2001 | Wu | 439/567 |
| 6,246,578 | B1 | * | 6/2001 | Wei et al. | 361/686 |

OTHER PUBLICATIONS

German Office Action dated Apr. 10, 2002.
Hascher, W., "Messdatenerfassung mobil", Messen' Testen, Elekronik Feb. 1995, pp. 58–63.

* cited by examiner

Primary Examiner—Darren Schuberg
Assistant Examiner—Hung Van Duong
(74) Attorney, Agent, or Firm—Ostrolenk, Faber, Gerb & Soffen, LLP

(57) ABSTRACT

An interface cable allows the number of components and manufacturing costs to be reduced. The interface cable has a housing defining an inner volume which has an opening. A first connector is removably connectable to one of a computer and a portable terminal. The first connector protrudes through the opening in the housing. An interface circuit is coupled to the first connector in which the interface circuit is located within the housing. A cable is coupled to the interface circuit. A second connector is removably connectable to the other of the computer and the portable terminal.

17 Claims, 8 Drawing Sheets

INTERFACE CABLE

BACKGROUND OF THE INVENTION

1. Field of the Invention

The present invention relates to an interface cable for connecting a portable terminal to a computer in which the portable terminal is comprised, for example, of a data transmission apparatus and a mobile communication apparatus.

2. Description of the Related Art

Generally, a portable terminal, such as a data transmission apparatus coupled with a mobile communication apparatus, has an input/output terminal for inputting and/or outputting information for communication with an external apparatus. A computer also has an input/output terminal that allows input and/or output of information for communication with various peripheral apparatuses. In particular, recently developed personal computers include one or more general-purpose input/output terminals, such as universal serial bus (USB) terminals and/or IEEE-1394 terminals. The input/output terminals of the portable terminal and the computer are connected to each other via an interface circuit, thereby allowing communication between the portable terminal and the computer.

In order to communicate information between the portable terminal and the input/output terminal of the computer, computer-side information must be converted to information readable by the portable terminal. Also, portable-terminal-side information must be converted to information readable by the computer. For the conversion of the information, an interface circuit is required. A conventional interface cable has the aforementioned interface circuit between its ends to bilaterally convert the portable-terminal-side information and the computer-side information to an information format readable by the recipient.

Hereinbelow, referring to FIGS. 7 to 9, a description will be given of an example conventional interface cable. The conventional interface cable is used to connect a personal digital cellular terminal (which is referred to as a PDC terminal herein) provided as an input/output terminal in a portable telephone T to a USB terminal provided as an input/output terminal in a computer C.

In the figures, a PDC connector unit 1 to be connected to the PDC terminal of the portable telephone T comprises a PDC connector housing 2, a PDC connector 3, hooks 4, and operation sections 5. The connector housing 2 is formed into a box-shape having an open end which is comprised of a rectangular upper housing 2A and a rectangular lower housing 2B. The PDC connector 3 is attached to the open side of the connector housing 2 and is connectable to the PDC terminal of the portable telephone T. The hooks 4 are provided on the lateral faces of the PDC connector housing 2 which are arranged to be substantially perpendicular to the open side of the PDC connector housing 2 so as to be engaged with and disengaged from the PDC terminal. The operation sections 5 are used to disengage the individual hooks.

On the PDC connector 3, for example, 16 electrode terminals 3A are provided. One end of a telephone-side cable 6 is connected to the individual electrode terminals 3A via core wires 6A. The PDC connector unit 1 is connected to an interface circuit 7 via the telephone-side cable 6.

The interface circuit 7 is connected to the other end of the telephone-side cable 6 and includes a circuit housing 8 and a circuit board 9. The circuit housing 8 is formed into a container and is comprised of an upper housing 8A and a lower housing 8B. The circuit board 9 on which integrated circuit elements (ICs) and other circuit elements are formed is provided in the circuit housing 8. The other end of the telephone-side cable 6 is connected to the circuit board 9 via the 16 core wires 6A. Also, one end of a computer-side cable 10 is connected to the circuit board 9, via four core wires 10A. The interface circuit 7 configured as described above uses the ICs and other circuit elements which are provided on the circuit board 9. The interface circuit 7 converts the computer-side information C to information readable by the portable telephone T, and converts the portable-telephone-side information to information readable by the computer C.

The USB connector 11 is connectable to a USB terminal on the computer C. The USB connector 11 is formed of a USB-connector housing 12 and a USB plug 13. The USB-connector housing 12 forms a box-shaped container having one open end and includes an upper housing 12A and a lower housing 12B. The USB plug 13 is connectable to the USB terminal of the computer C and is provided in the USB-connector housing 12.

In the USB plug 13, for example, four electrode terminals 13A are provided. The other end of the core wires 10A of the computer-side cable 10 is connected to the electrode terminals 13A. The USB connector 11 is connected to the interface circuit 7 via the computer-side cable 10.

The conventional interface cable is configured as described above. Hereinbelow, operation of the interface cable is described.

For example, to perform communication between an external apparatus and the computer C through the portable telephone T, the PDC connector unit 1 is connected to the PDC terminal of the portable telephone T, and the USB connector 11 is connected to the USB terminal of the computer C. Thereby, the interface circuit 7, which is provided between the portable phone and the computer via each respective connector, converts information transmitted by the computer C to information readable by the portable telephone T. Also, the interface circuit 7 converts information transmitted by the portable telephone T to information readable by the computer C. This allows the computer-side information to be sent to an external apparatus through the portable telephone. Also, information transmitted by an external device can be read into the computer C through the portable telephone T.

In addition, using the interface cable allows information such as remote phone addresses stored in a memory of the portable telephone T to be read into the computer C and allows the edited information to be stored back in the memory of portable telephone T.

As described above, the interface circuit 7 is provided between the PDC connector unit 1 and the USB connector 11. Therefore, in order to manufacture the interface cable, the PDC connector unit 1, the interface circuit 7, and the USB connector 11 must be individually assembled. Also, these components must be connected using two cables, namely the telephone-side cable 6 and the computer-side cable 10. This creates a problem in that the interface cable is comprised of a large number of components, thereby reducing manufacturing productivity and increasing manufacturing costs.

SUMMARY OF THE INVENTION

In view of the problems described above, it is an object of the present invention to provide an interface cable that allows the number of components and manufacturing costs to be reduced.

To achieve this object, the present invention provides an interface cable as described below.

According to one aspect, the present invention provides a device for facilitating communication between a portable terminal and a computer in which a housing defines an inner volume and has an opening. A first connector is removably connectable to one of a computer and a portable terminal and protrudes through the opening in the housing. An interface circuit is coupled to the first connector in which the interface circuit is located within the housing. A cable is coupled to the interface circuit. A second connector is removably connectable to the other. of the computer and the portable terminal.

According to another aspect, the present invention provides an interface device for coupling a PDC terminal with a USB terminal on a computer in which a housing defines an inner volume and has an opening. A PDC connector is removably connectable the PDC terminal. The PDC connector protrudes through the opening in the housing. An interface circuit is coupled to the PDC connector in which the interface circuit is located within the housing. A cable is coupled to the interface circuit. A USB connector is removably connectable to the computer.

The present invention advantageously allows the information-converting interface circuit and one of the portable-terminal-side connector and the computer-side connector to be integrally provided in a single housing. Therefore, the interface cable can be configured with fewer components than in the case where the interface circuit and the connectors are individually provided in separate housings. Accordingly, the present invention reduces assembly time, thereby improving manufacturing productivity.

Also, in the interface cable of the present invention, one of the portable-terminal-side connector and the computer-side connector may comprise a plurality of electrode terminals connectable to mating terminals. Also, obverse and reverse faces of a circuit board of the information-converting interface circuit may be positioned between the electrode terminals of one of the portable-terminal-side connector and the computer-side connector. The interface circuit can advantageously be positioned by using the electrode terminals of one of the connectors to surround an edge of the interface circuit board. This facilitates connection of the electrode terminals on the connector to the circuit board.

Also, use of the electrode terminals allows the circuit board to be positioned substantially centered heightwise with respect to the connector. Therefore, even when integrated circuits and other circuit elements are mounted on obverse and reverse faces, the circuit board can be easily stored in the connector housing. Providing circuit elements on both sides of the circuit board allows miniaturization of the circuit board.

In addition, in the interface cable of the present invention, one of the portable-terminal-side connector and the computer-side connector may comprise a plurality of electrode terminals connectable to mating terminals. Also, the electrode terminals of the one of the portable-terminal-side connector and the computer-side connector may be connected to an obverse face of a circuit board of the information-converting interface circuit.

In this case, the electrode terminals of the connector are connected to only the obverse face of the interface circuit board. This further simplifies connection manufacturing compared to the case where the electrode terminals are connected to both the obverse and reverse faces of the circuit board.

Therefore the interface circuit. and the other of the connectors that is separately provided can be connected by a cable having a smaller number of core wires. As such, a less-expensive cable having a reduced number of core wires can be used.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown.

DESCRIPTION OF THE PREFERRED EMBODIMENT

Referring to FIGS. 1 to 6, a detailed description is given of an interface cable constructed according to an embodiment of the present invention. As described herein, like reference symbols refer to like elements.

Figure 1:
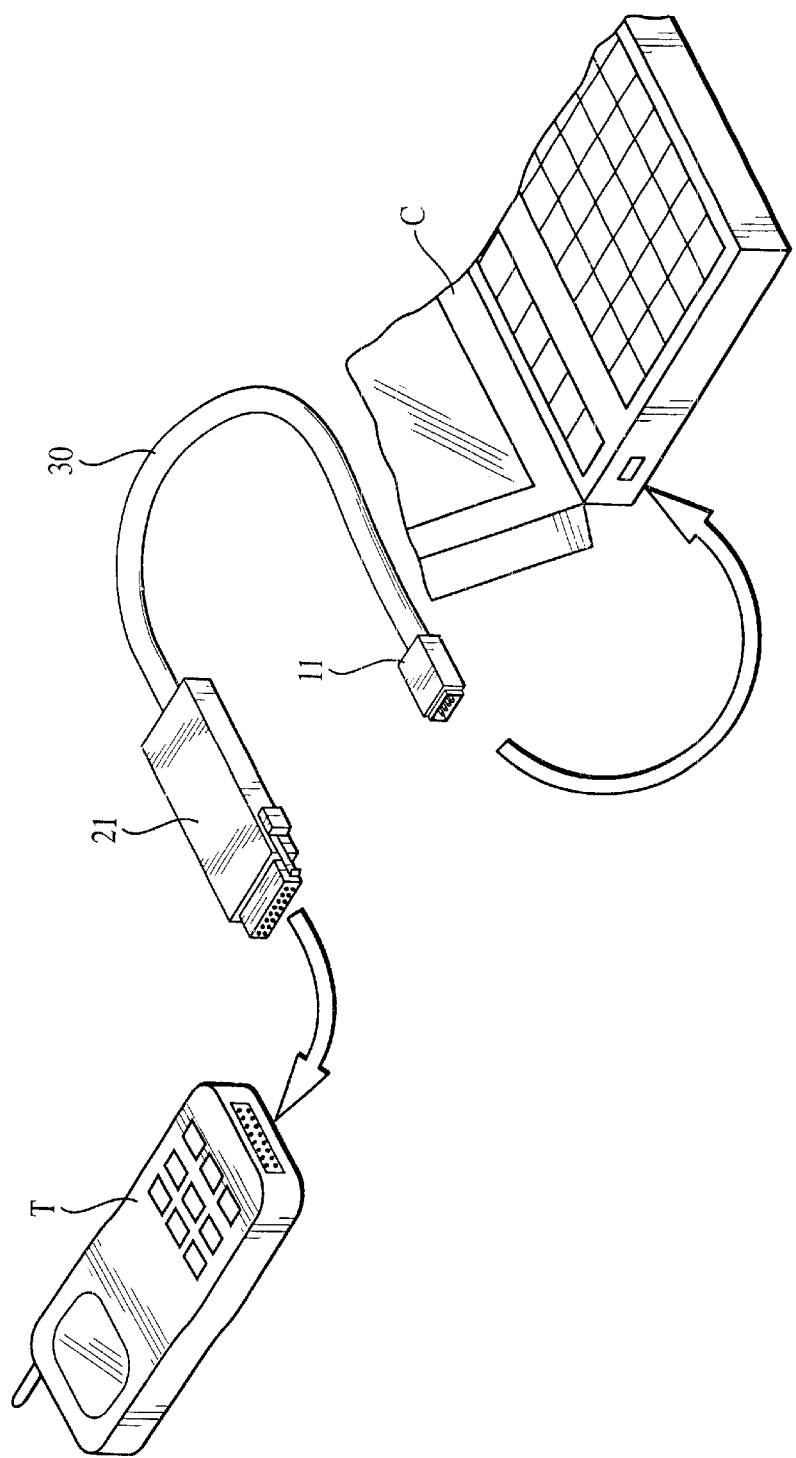
FIG. 1 is a perspective view showing an embodiment of an interface cable according to the present invention together with a portable telephone and a computer that are connectable via the interface cable.
Figure 2:
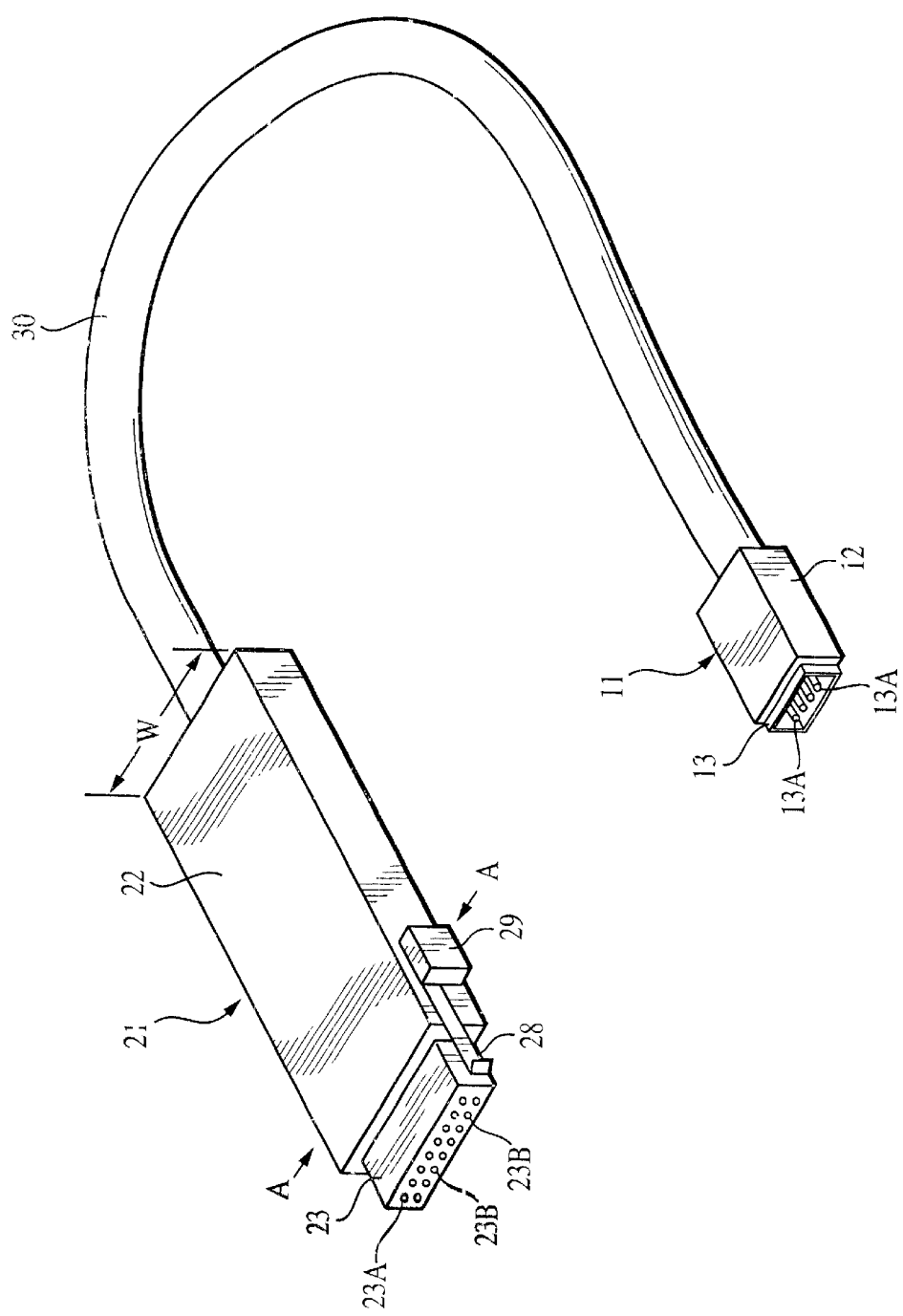
FIG. 2 is a perspective view of the interface cable according to the present invention.
Figure 3:
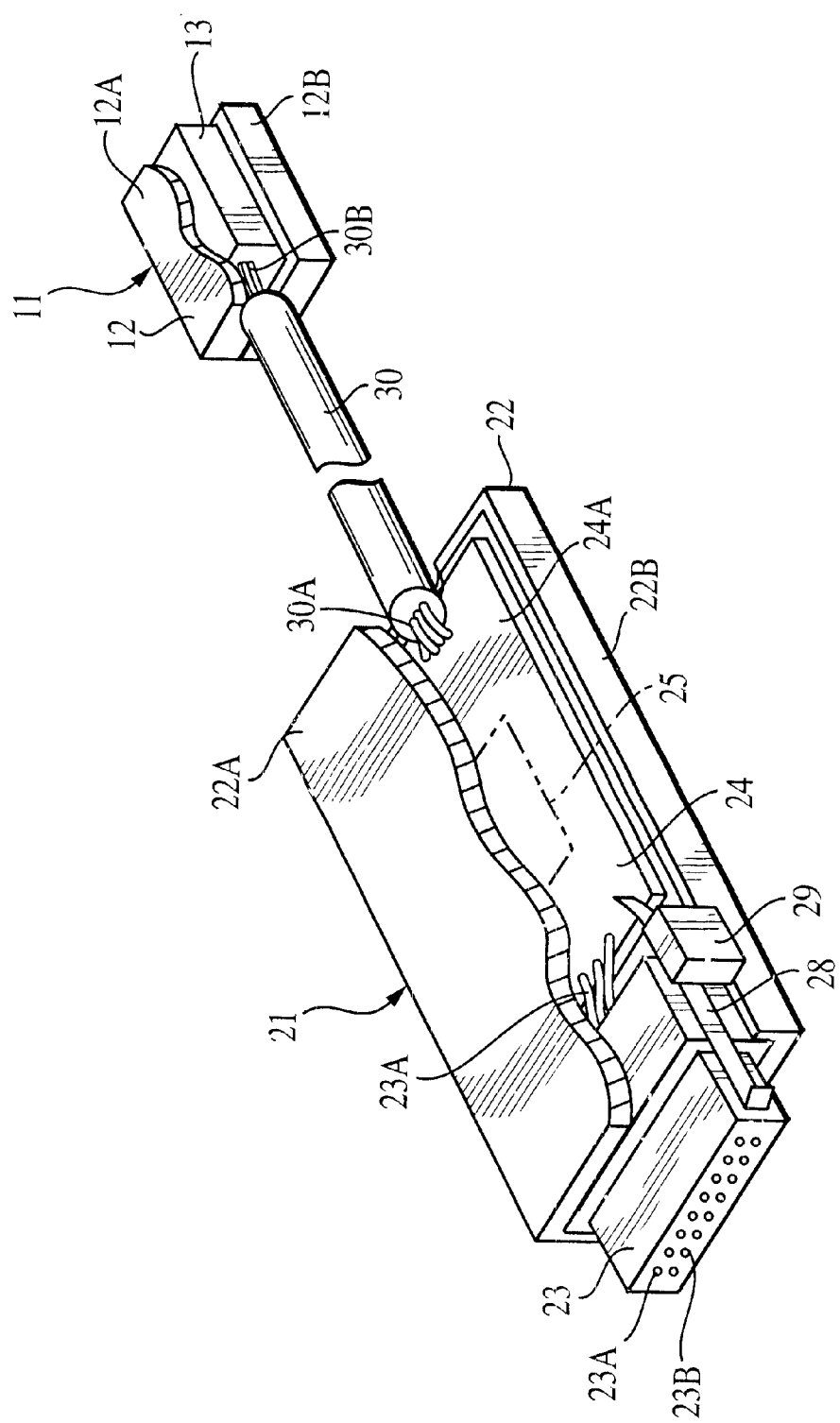
FIG. 3 is a partly-broken perspective view of the interface cable according to the present invention.
Figure 4:
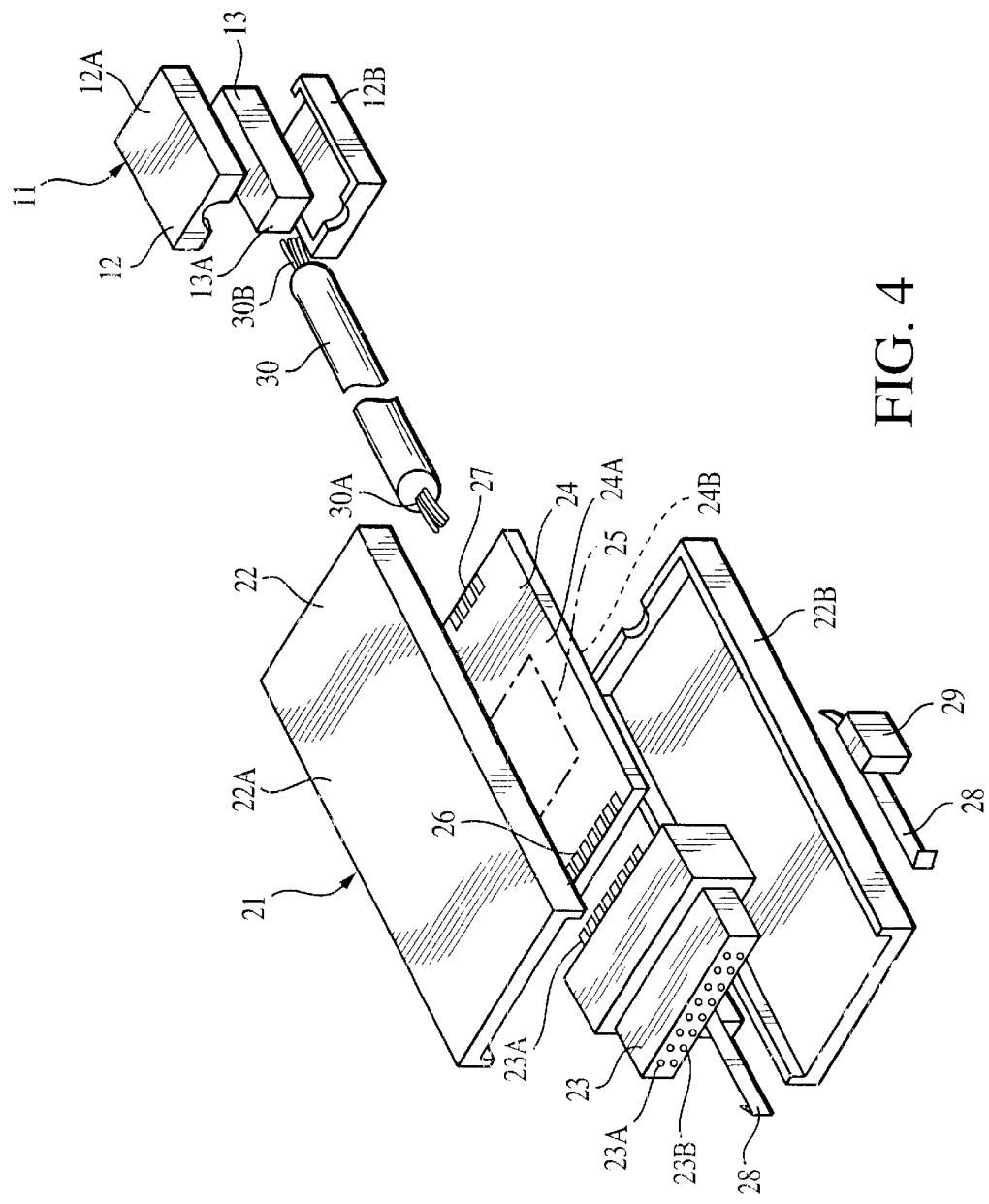
FIG. 4 is an exploded perspective view of the interface cable the present invention.
Figure 5:
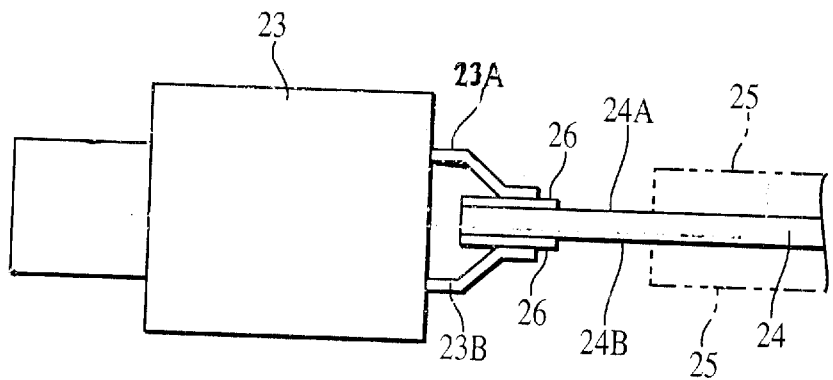
FIG. 5 is an enlarged view of a portion of the interface cable of the present invention detailing the connection between a PDC terminal and a circuit board.

As shown in FIGS. 1–6, an integrated connector unit 21 is comprised of a personal digital cellular (PDC) connector integrated with an interface circuit. The PDC connector is connected to a PDC terminal in a portable telephone T. In particular, as shown in FIGS. 2–4, the connector unit 21 includes a connector housing 22, a PDC connector 23, a circuit board 24, hooks 28, and operation sections 29.

The connector housing 22 defines the outer shape of the integrated connector unit 21. The connector housing 22 includes a substantially rectangular shaped upper housing 22A and a substantially rectangular shaped lower housing 22B, defining a substantially rectangular-parallelepiped box having an open end. Width W of the connector housing 22 is determined to be substantially the same as the width of the PDC connector housing 2 in order to ensure operability of the operation section 29.

The PDC connector 23 is attached on the open side of the connector housing 22 so as to be connectable to the PDC terminal in the portable telephone T. The PDC connector 23 preferably includes eight pairs of upper electrode terminals 23A and lower electrode terminals 23B that are vertically spaced apart from each other. As such, 16 total electrode terminals 23A and 23B are preferably provided therein. The upper electrode terminals 23A and the lower electrode terminal 23B are arranged substantially parallel with each other in the transverse (along the width) direction of the PDC connector 23.

The interface circuit is provided on the circuit board 24. The circuit board 24 is preferably formed as a rectangular and planar board and is contained within the connector housing 22. The circuit board 24 has an obverse face 24A and a reverse face 24B upon each of which various integrated circuits (ICs) 25 and other circuit elements are mounted. The ICs 25 and the other circuit elements convert information transmitted by the computer C to information readable by the portable telephone T. Also, the ICs 25 and the other circuit elements convert information transmitted by the portable telephone T to information readable by the computer C.

Also, as shown in FIG. 4, portable-telephone-side electrode sections 26 preferably numbering eight in quantity are provided at one edge of each of the obverse face 24A and reverse face 24B of the circuit board 24 in the transverse (width) direction. As such, 16 total portable-telephone-side electrode sections 26 are provided on the circuit board 24. The circuit board 24 is coupled between the upper electrode terminals 23A and the lower electrode terminals 23B of the PDC connector 23.

When assembled, the upper electrode terminals 23A of the connector 23 are connected with respective portable-telephone-side electrode sections 26 of the obverse face 24A of the circuit board 24 by a method such as soldering. Similarly, the lower electrode terminals 23B of the connector 23 are, respectively, connected with the portable-telephone-side electrode sections 26 of the reverse face 24B. In addition, computer-side electrode sections 27 of the circuit board 24, preferably numbering four in quantity, are provided at the opposite edge of the obverse face 24A in the transverse direction on the circuit board 24. The computer-side electrode sections 27 are connected to core wires 30A of a cable 30 described below.

Hooks 28 are provided on the opposite lateral faces of the connector housing 22 so as to be attachable with and detachable from the PDC terminal. In an engaged state, the hooks 28 are outwardly urged by their springing characteristics. Also, an operation section 29 is provided on each of the hooks 28. When the operation sections 29 are pressed inward as indicated by arrows A in FIG. 2, the individual hooks 28 are disengaged from the PDC terminal.

The cable 30 preferably connects. the integrated connector unit 21 to a universal-serial-bus (USB) connector unit 11. The cable 30 has core wires 30A, preferably numbering four in quantity, at one end and wires 30B at the other end preferably numbering four in quantity that are the same as those in the computer-side cable 10, described above. Each of the core wires 30A is connected to a respective computer-side electrode section 27 on the circuit board 24. Each of the core wires 30B is connected a respective electrode terminal 13A on the USB plug 13.

A description in given of the operation of the interface cable constructed according to the present invention.

The interface cable of the present invention has no particular difference in its basic operation from the conventional interface cable described above. In the interface cable of the present invention, however, the PDC connector 23, connectable to the PDC terminal of the portable telephone T, and the circuit board 24, including the interface circuit, are integrated within the connector housing 22. Therefore, the conventional portable-telephone-side cable 6 provided to connect the PDC connector 23 to the circuit board 24 is omitted by the present invention.

In addition, the number of components is advantageously reduced compared with the conventional cable where the PDC connector 23 and the circuit board 24 are separately located in different housings. The present invention therefore reduces manufacturing costs and assembly time, thereby improving the manufacturing productivity of the interface cable.

Also, by providing the circuit board 24 on the PDC connector 23 with 16 electrode terminals 23A and 23B, the circuit board 24 can be connected to the USB connector unit 11 by the cable 30 using only four core wires 30A (and 30B). This allows manufacturing costs to be lower than in the conventional case where the cable contains 16 core wires.

Also, when both ends of each of the 16 core wires are connected in the conventional cable, as many as 32 ends must be connected and soldered. However, in the case of the cable 30 that contains only four core wires 30A (and 30B), only eight ends need be connected. This simplifies assembly procedures, thereby improving manufacturing productivity.

In addition, the electrode terminals 23A and 23B are assembled so as to substantially surround an edge of the circuit board 24 via the obverse face 24A and the reverse face 24B. Therefore, during assembly, the upper electrode terminals 23A and the lower electrode terminals 23B can be easily soldered to the corresponding portable-telephone-side electrode sections 26 of the circuit board 24.

Furthermore, using the upper electrode terminals 23A and the lower electrode terminals 23B allows the circuit board 24 to be substantially centered with respect to the height of PDC connector 23. Therefore, even when the ICs 25 and other circuit elements are provided on both faces, that is, the obverse face 24A and the reverse face 24B, the circuit board 24 can be easily accommodated within the connector housing 22. This allows the circuit board 24 to be miniaturized.

Figure 6:
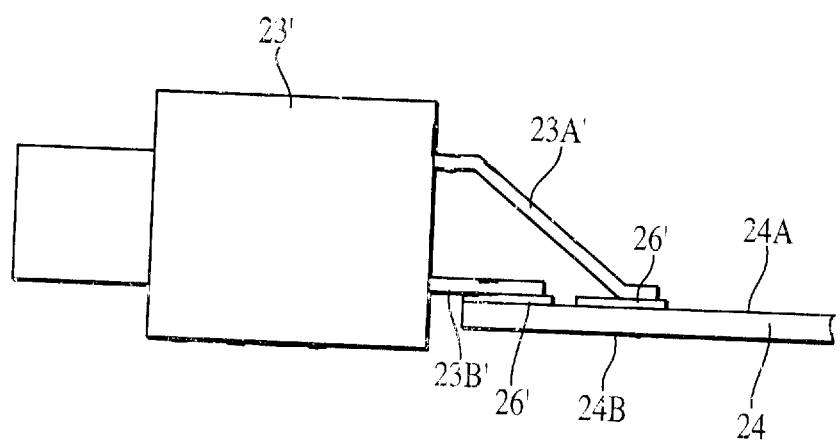
FIG. 6 is an enlarged view of a portion of the interface cable of the present invention showing an alternative connection between the PDC terminal and the circuit board.
Figure 7:
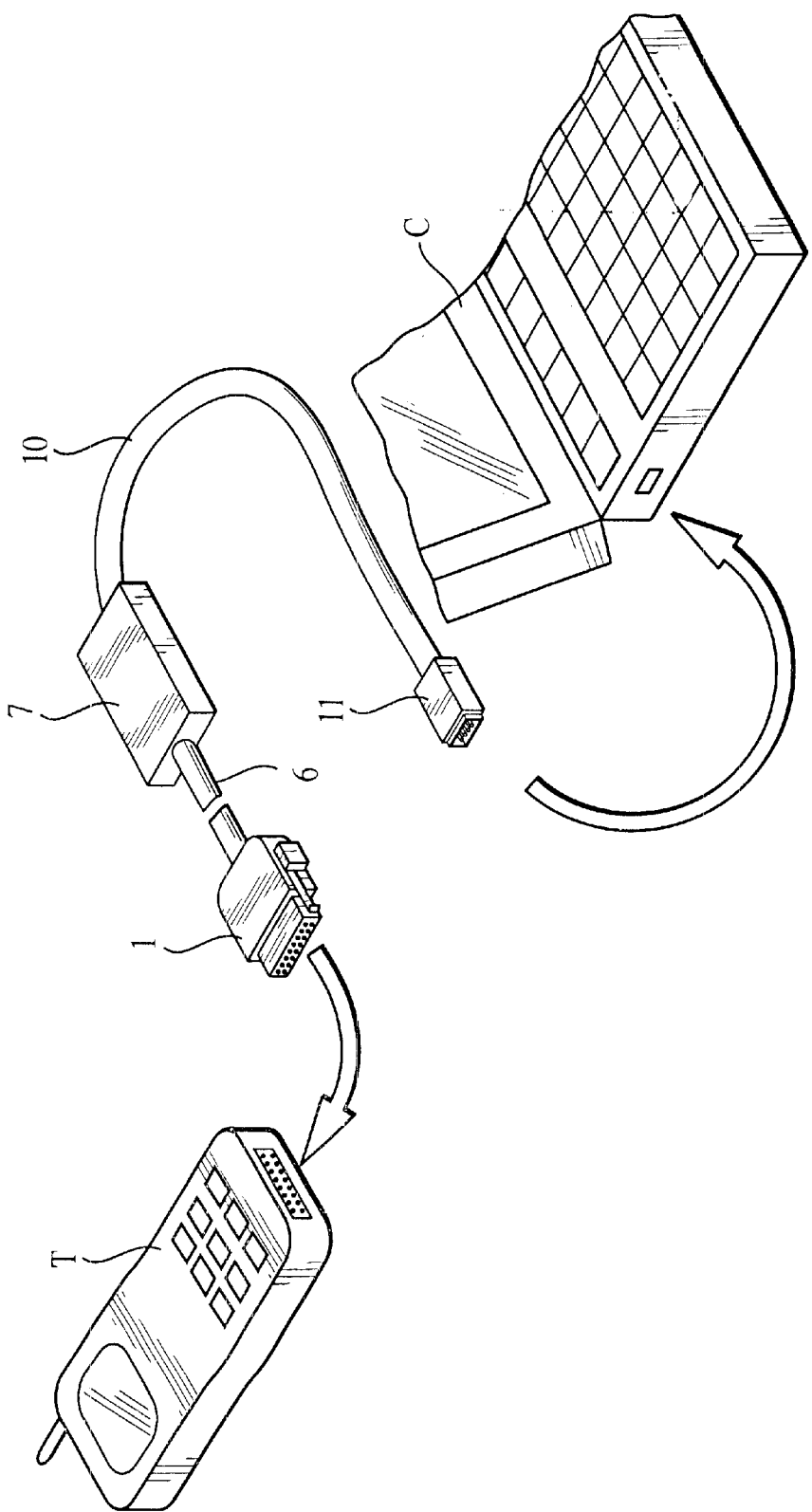
FIG. 7 is a perspective view showing a conventional interface cable together with a portable telephone and a computer that are connectable via the interface cable.
Figure 8:
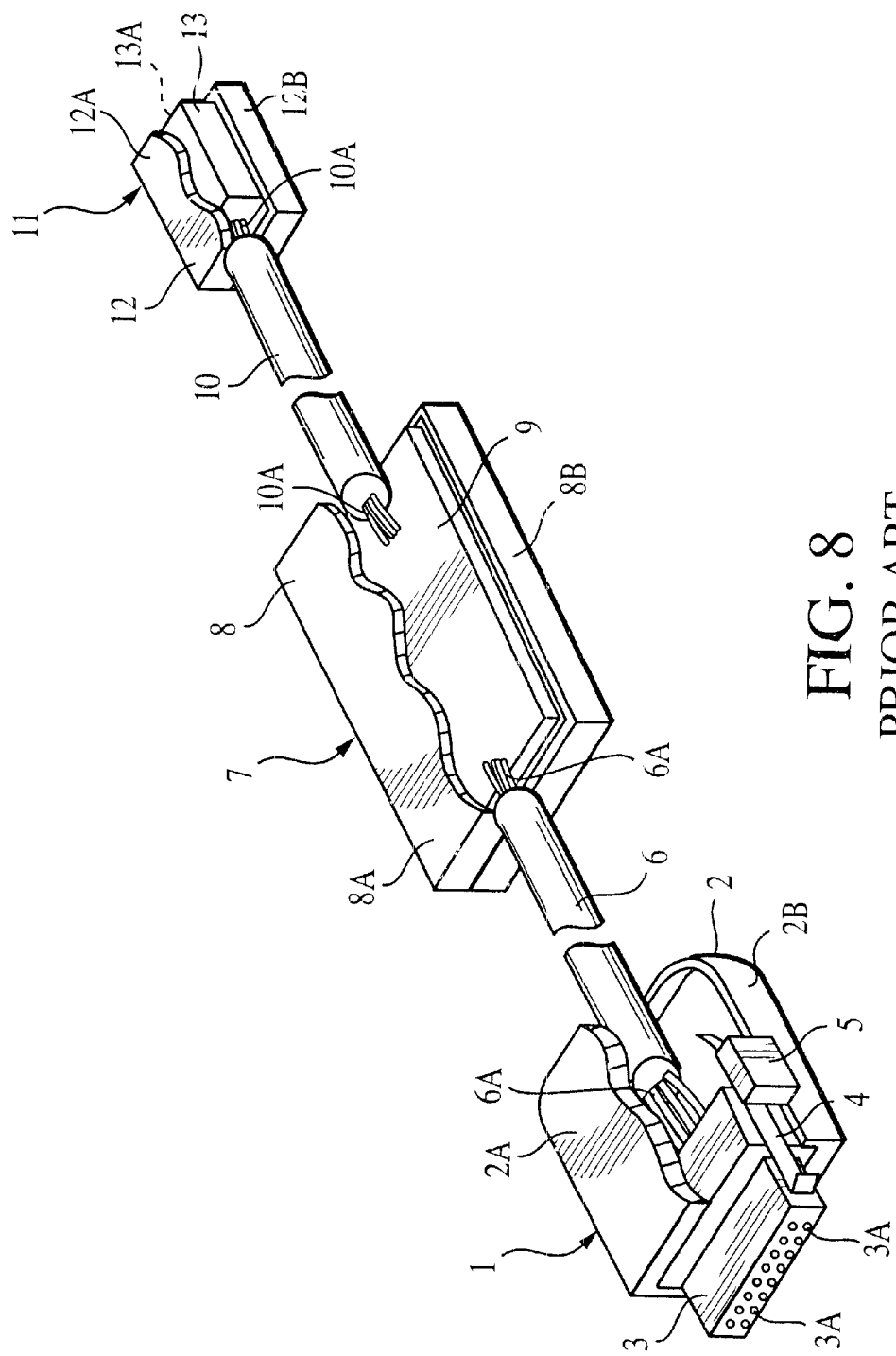
FIG. 8 is a partly-broken perspective view of the conventional interface cable shown in FIG. 7.
Figure 9:
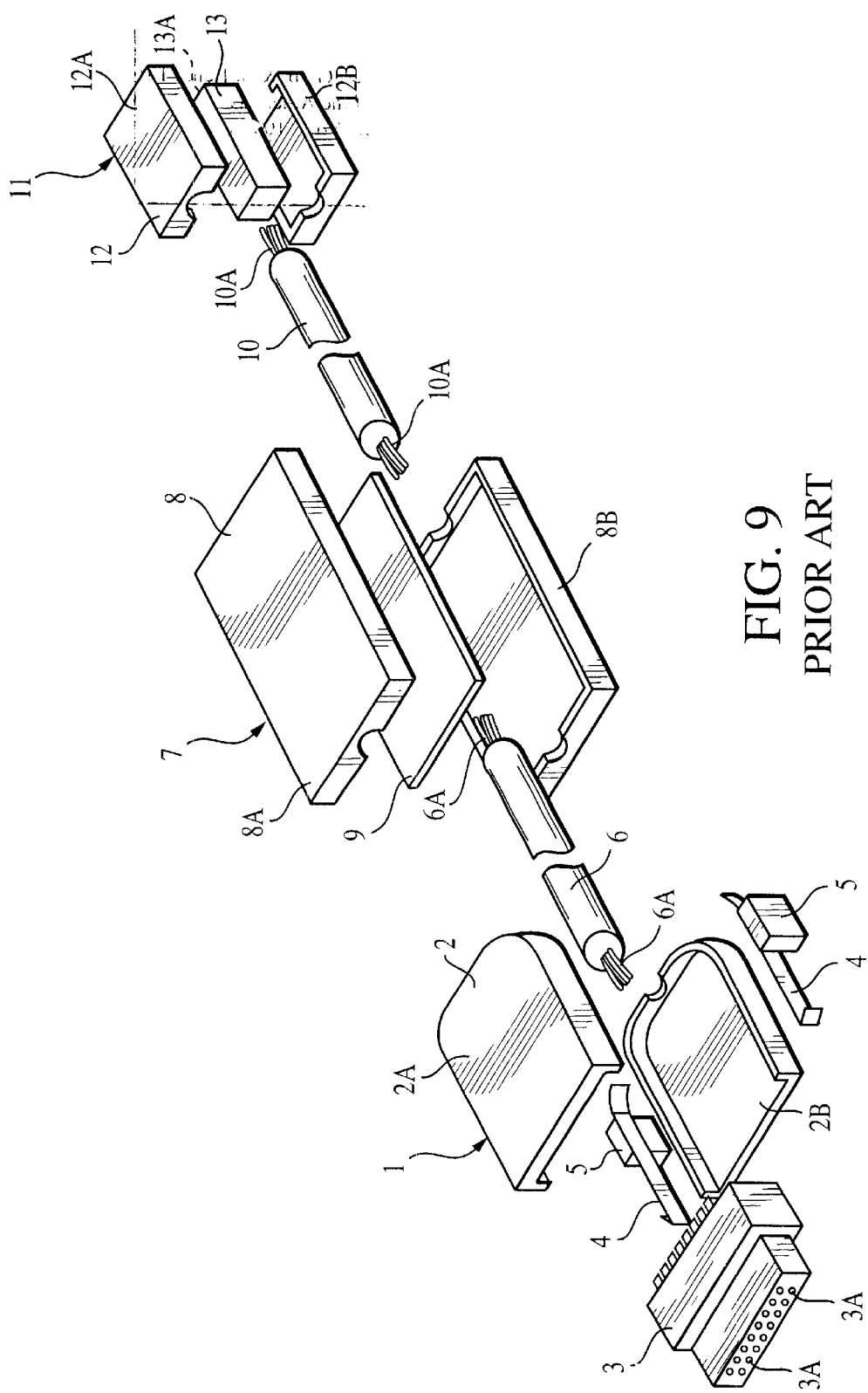
FIG. 9 is an exploded perspective view of the conventional interface cable shown in FIG. 7.

The above described arrangement provides electrode terminals 23A and 23B of the PDC connector 23 which substantially surround the edge of obverse face 24A and the reverse face 24B of the circuit board 24. However, the present invention is not restricted solely to this arrangement. For example, a modified configuration is shown in FIG. 6. As shown in FIG. 6, 16 portable telephone-side electrode sections 26' are provided on the obverse face 24A of the circuit board 24. Also, electrode terminals 23A' and 23B' of a PDC connector 23' are connected to the portable-telephone-side electrode sections 26'.

In the modified arrangement, connections of the electrode terminals 23A' and 23B' and the portable-telephone-side electrode sections 26' are arranged in two rows on the obverse face 24A (or the reverse face 24B) of the circuit board 24. However, it is also contemplated that the connections may be arranged in a single row or any other suitable pattern.

According to the modified arrangement, soldering is only necessary on the obverse face 24A of the circuit board 24 to connect the electrode terminals 23A' and 23B', and the portable telephone-side electrode sections 2640 . Therefore, compared to the case where soldering must be performed or both the obverse face 24A and reverse face 24B, the efficiency of connection manufacturing is advantageously further improved.

Also, in the configuration of the described embodiment, the PDC connector 23 and the circuit board for the interface circuit are provided in a single connector housing 22.

However, it is contemplated that the circuit board and the USB connector unit on the computer side may be provided in a single housing.

In addition, in the described embodiment, the description refers to an example interface cable for connecting a PDC terminal on the portable telephone to a USB terminal on a computer. However, the present invention is not restricted to this described example. For example, the present invention may be applied to an interface cable for connection to a different type of portable terminal, such as a personal digital assistant (PDA), instead of a portable telephone. Also, the present invention may be applied to an interface cable for connection to a different general purpose terminal in the computer, such as an IEEE-1394 terminal, instead of a USB terminal.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A device for facilitating communication between a portable terminal and a computer, the device comprising:
    a housing defining an inner volume and having an opening;
    a first connector removably connectable to one of a computer and a portable terminal, the first connector being disposed at the opening;
    an interface circuit coupled to the first connector, the interface circuit being located within the housing;
    a second connector removably connectable to the other of the computer and the portable terminal, the second connector being separated from the housing; and
    a cable disposed between the interface circuit and the second connector;
    wherein the interface circuit is disposed between the first connector and second connector.

2. The device according to claim 1, wherein the first connector is comprised of sixteen pins and the second connector is comprised of four pins.

3. The device according to claim 1, wherein the first connector is a PDC connector and the second connector is a USB connector.

4. The device according to claim 1, wherein the first connector is a USB connector and the second connector is a PDC connector.

5. The device according to claim 1, wherein the interface circuit is comprised of:
    a circuit board having:
        an obverse face;
        a reverse face on a side opposite the obverse face; and
        at least one electrode section on a surface of at least one of the obverse face and the reverse face located at a first edge area of the circuit board, the edge area being at approximately an end of the obverse face and the reverse face; and
    at least one circuit element mounted on at least one of the obverse face and reverse face,
    wherein the first connector is coupled to the at least one electrode section at the first edge area.

6. The device according to claim 5, wherein the circuit board has a plurality of circuit elements, at least one circuit element being mounted to the obverse face and at least one circuit element being mounted to the reverse face.

7. The device according to claim 5, wherein the circuit board has a plurality of electrode sections and the first connector has a plurality of electrode terminals coupled to respective electrode sections.

8. The device according to claim 7, wherein at least one of the plurality of electrode sections is located on the obverse face and another of the plurality of electrode sections is located on the reverse face, the plurality of electrode terminals being arranged into two rows, the circuit board being positioned between the rows.

9. The device according to claim 7, wherein the plurality of electrode sections are all located on one of the obverse face and the reverse face.

10. The device according to claim 9, wherein the plurality of electrode sections are arranged in a plurality of rows.

11. The device according to claim 5, wherein the circuit board further includes at least one other electrode section on a surface of at least one of the obverse face and the reverse face located at a second edge area of the circuit board, the second edge area being at approximately an end of the obverse face and the reverse face opposite the first edge area.

12. The interface device according to claim 11, wherein the cable is coupled to the interface circuit at respective one of the at least one electrode section located at the second edge of the circuit board.

13. The device according to claim 1, wherein the first connector and the second connector are each comprised of a different number of electrode terminals, the first connector having a greater number of electrode terminals than the second connector.

14. An interface device for coupling a PDC terminal with a USB terminal on a computer, the device comprising:
    a housing defining an inner volume and having an opening;
    a PDC connector removably connectable to the PDC terminal, the PDC connector being disposed at the opening;
    an interface circuit coupled to the PDC connector, the interface circuit being located within the housing;
    a USB connector removably connectable to the computer, the USB connector being separated from the housing; and
    a cable disposed between the interface circuit and the USB connector;
    wherein the interface circuit is disposed between the PDC connector and the USB connector.

15. The interface device according to claim 14, wherein the interface circuit is comprised of:
    a circuit board having:
        an obverse face;
        a reverse face on a side opposite the obverse face;
        at least one electrode section on a surface of at least one of the obverse face and the reverse face located at a first edge area of the circuit board, the first edge area being at approximately an end of the obverse face and the reverse face;
        at least one other electrode section on a surface of at least one of the obverse face and the reverse face located at a second edge area of the circuit board, the second edge area being at approximately an end of the obverse face and the reverse face opposite the first edge area;
        at least one circuit element mounted on at least one of the obverse face and reverse face,
        wherein the first connector is coupled to the at least one electrode section at the edge area.

16. The interface device according to claim 15, wherein the cable is coupled to the interface circuit at respective one of the at least one electrode section located at the second edge of the circuit board.

17. The interface device according to claim 16, wherein the cable includes four wires.

* * * * *